HIGH SPEED STEPPING SWITCH CIRCUIT

Filed Aug. 18, 1961 2 Sheets-Sheet 1

INVENTORS J. H. FENNICK
R. A. KAENEL
BY Lucian C. Canepa

ATTORNEY

Oct. 29, 1963 J. H. FENNICK ET AL 3,109,108

HIGH SPEED STEPPING SWITCH CIRCUIT

Filed Aug. 18, 1961 2 Sheets-Sheet 2

INVENTORS J. H. FENNICK
R. A. KAENEL
BY Lucian C. Canepa
ATTORNEY

United States Patent Office
3,109,108
Patented Oct. 29, 1963

3,109,108
HIGH SPEED STEPPING SWITCH CIRCUIT

John H. Fennick, Plainfield, and Reginald A. Kaenel, Murray Hill, N.J., assignors to Bell Telephone Laboratories, Incorporated, New York, N.Y., a corporation of New York Filed Aug. 18, 1961, Ser. No. 132,433
1 Claim. (Cl. 307—88.5)

Figure 1:
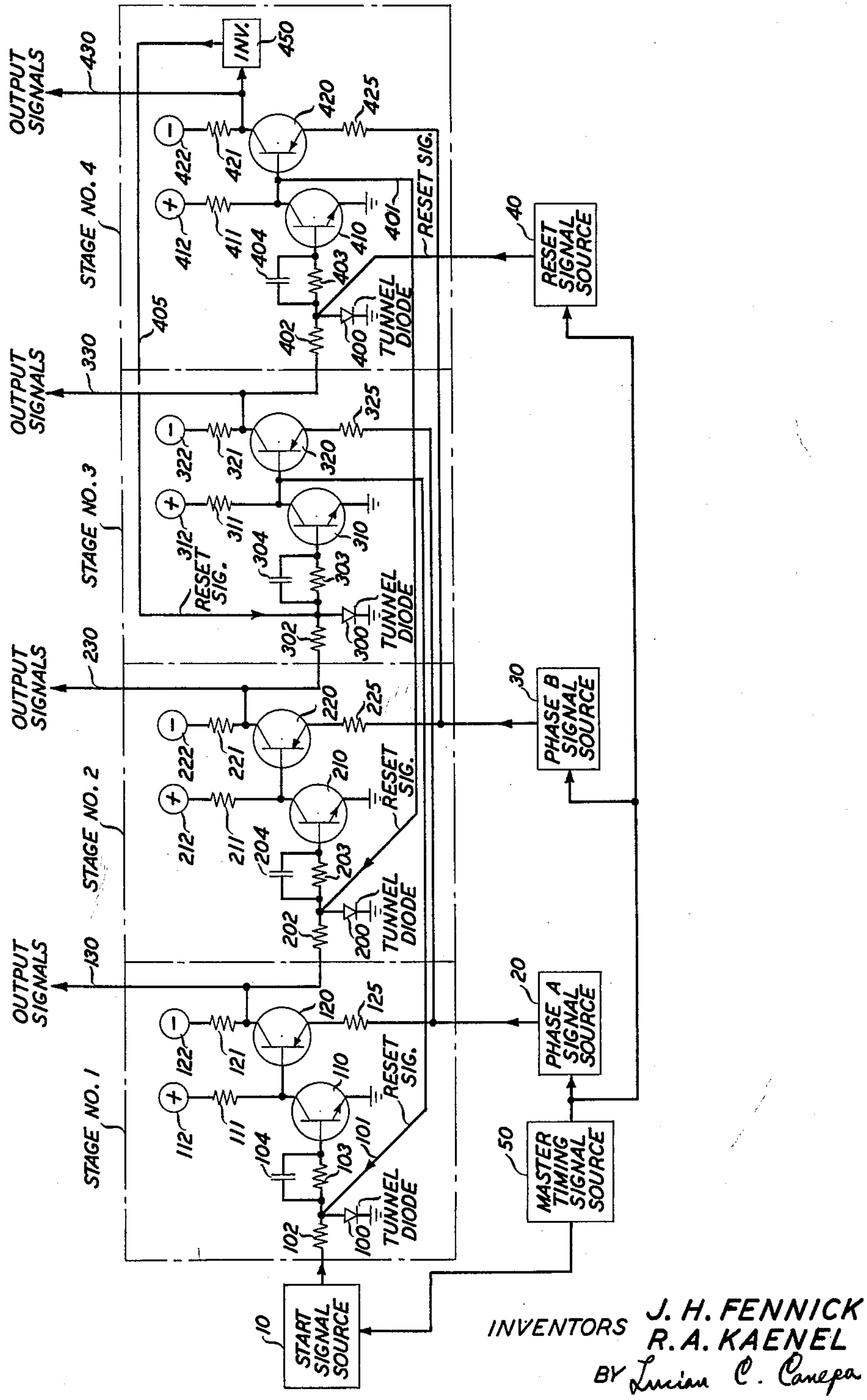

This invention relates to signal processing circuits, and more particularly to a high speed stepping switch circuit.

Stepping switch circuits are useful in information processing systems as timing signal sources to sequentially control the operation of the systems. As the speed, reliability and complexity of such systems have increased, the need has arisen for stepping switch circuits that are faster, more reliable and more flexible in their capabilities than presently available stepping circuits.

An object of the present invention is the improvement of signal processing circuits, particularly stepping switch circuits.

Another object of this invention is the provision of stepping switch circuits which are characterized by high speed, simplicity of design and high reliability.

A further object of the present invention is the provision of stepping switch circuits which operate from very low power driving sources.

Still another object of this invention is the provision of stepping switch circuits in which the driving power required therefor is independent of the number of stages thereof.

Yet another object of the present invention is the provision of multistage stepping switch circuits in which the output of each stage may be either a single signal or a group of signals, depending on the nature of the output of the driving sources.

These and other objects of the present invention are realized in a specific illustrative stepping switch circuit embodiment that includes a plurality of stages each of which comprises a first switching transistor having an output path and, in addition, a bistable-biased voltage-controlled negative resistance diode and a second switching transistor for controlling the condition of the first transistor. The first switching transistors in the odd-numbered stages are driven by one phase of a two-phase signal source and those in the even-numbered stages are driven by the other phase of the two-phase source.

The application of a start signal to the diode in the first stage of the circuit initiates a cycle of operation in which signals appear in sequence on the output paths of the first switching transistors. Each of these output signals may be either a single signal or a group of signals, depending on the nature of the output of the two-phase signal source.

The appearance of a signal at the output of a stage causes the diode in the immediately preceding stage to be reset to the state in which its associated first and second switching transistors are de-energized or closed. At the same time, the diode in the next stage is set to the state in which its associated first and second switching transistors are energized or open. As a result, the subsequent application of the signal or signals of the other phase of the two-phase source to the preceding and next stages causes the signal or signals to be transferred only to the output path of the second transistor of the next stage, no output signal appearing at that time at the output of the closed or blocked second transistor of the preceding stage.

An illustrative stepping switch circuit made in accordance with the principles of the present invention also comprises an arrangement for resetting the diodes included in the last and next to last stages of the circuit and, in addition, comprises a master timing signal source for coordinating the over-all operation of the circuit.

It is a feature of the present invention that a stepping switch circuit include a plurality of stages each of which comprises a switching transistor and a bistable-biased voltage-controlled negative resistance diode for controlling the condition of the transistor.

It is another feature of this invention that a stepping switch circuit include a plurality of stages each of which comprises a switching transistor and a bistable-biased voltage-controlled negative resistance diode for controlling the condition of the transistor, and a two-phase source for supplying signals of one phase to the switching transistors included in the odd-numbered stages and signals of the other phase to the switching transistors included in the even-numbered stages, whereby the signals applied to a particular switching transistor appear at the output thereof only if that transistor is biased by its controlling diode to the energized or open condition.

It is still another feature of the present invention that a stepping switch circuit include a plurality of stages each of which comprises a switching transistor and a bistable-biased voltage-controlled negative resistance diode for controlling the condition of the transistor, a two-phase source for supplying signals of one phase to the switching transistors of the odd-numbered stages and signals of the other phase to the switching transistors of the even-numbered stages, and circuitry responsive to the appearance of a signal at the output of a switching transistor of one stage for resetting the diode included in the preceding stage and for setting the diode included in the next following stage.

Figure 2:
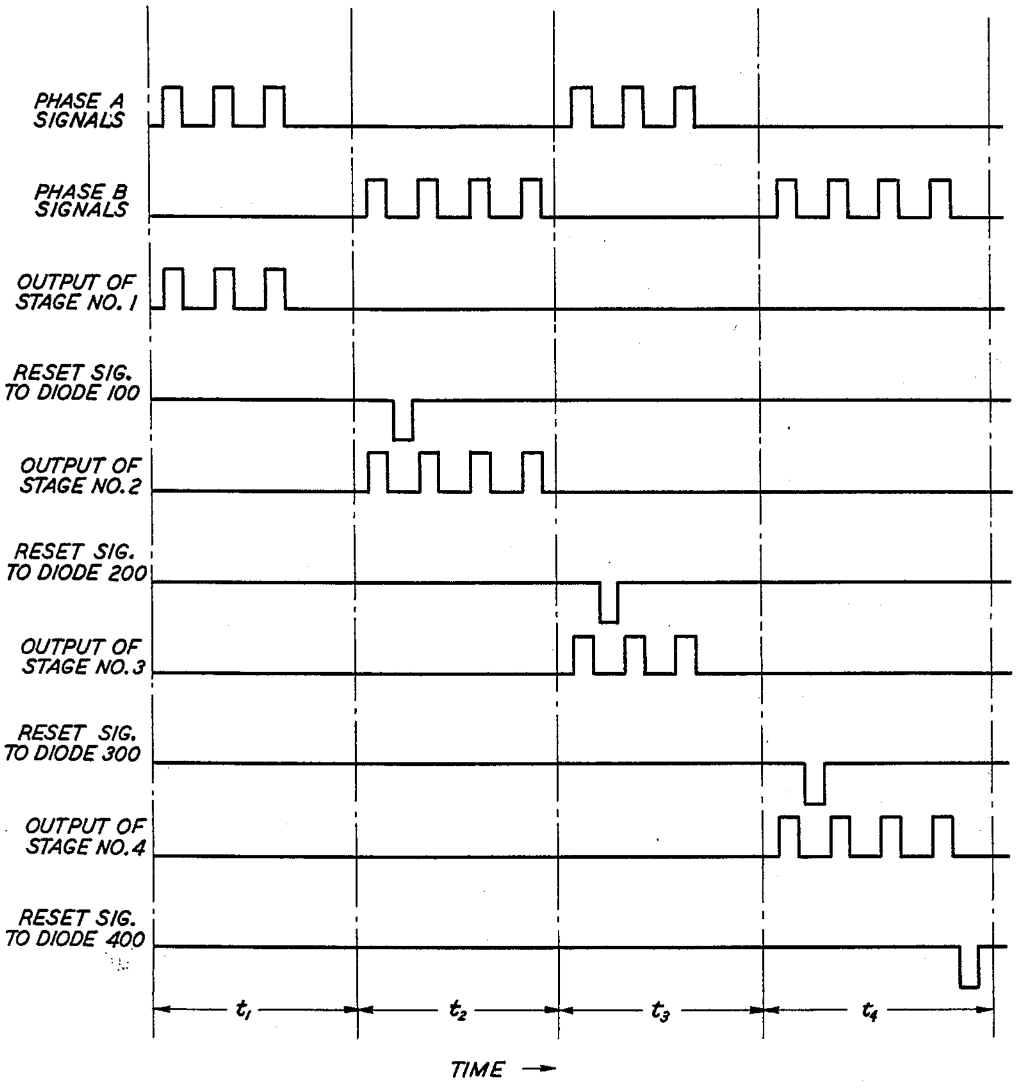

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a stepping switch circuit which illustratively embodies the principles of the present invention; and FIG. 2 illustrates various waveforms characteristic of the circuits shown in FIG. 1.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a specific illustrative four-stage stepping switch circuit made in accordance with the principles of the present invention. The stages are identical to each other except that stage No. 4 comprises an additional element, viz., an inverter 450, which is not included in any of the other three stages.

Stage No. 1 includes a voltage-controlled negative resistance diode 100, a first switching transistor 110 of the n-p-n type, and a second switching transistor 120 of the p-n-p type. The diode 100 is biased for bistable operation via a circuit path which includes lead 101, resistor 311 and source 312. Connected to the plate electrode of the diode 100 are an input resistor 102 and a coupling network comprising resistor 103 and capacitor 104, the network interconnecting the plate electrode of the diode 100 to the base of the transistor 110. The collector of the transistor 110 is connected via a bias resistor 111 to a positive voltage source 112. Also, the collector of the transistor 110 is directly connected to the base of the transistor 120 whose collector is connected via a bias resistor 121 to a negative voltage source 122.

The collector of the second switching transistor 120 of stage No. 1 of the illustrative circuit shown in FIG. 1 is connected to an output lead 130 and, through an input resistor 202, to the diode 200 of stage No. 2. The inputs to stage No. 1 are derived from a start signal source 10 and a phase A signal source 20, which sources 10 and 20 as well as a phase B signal source 30 and a reset signal source 40 are controlled by a master clock or timing signal source 50.

Assume that the diode 100 of stage No. 1 is initially biased by the resistor 311 and the source 312 at a relatively low voltage stable operating point on the voltage-current characteristic curve of the diode 100. The transistor 110 is biased by this relatively low voltage to a point of low current conduction and the collector of the transistor 110 is maintained by the source 112 at a sufficiently high positive potential with respect to ground to keep the transistor 120 de-energized or closed even when positive phase A signals are applied to the emitter thereof via input resistor 125. Under these conditions, any phase A signals which are applied to the emitter of the transistor 120 do not appear on the output lead 130 of stage No. 1. Similarly, each of the diodes 200, 300 and 400 is initially biased at a relatively low voltage stable operating point and, as a result, neither phase A nor phase B signals appear on output leads 230, 330 and 430.

Assume now that the start signal source 10 applies a positive signal via the input resistor 102 to the bistable-biased diode 100 to switch the diode 100 to its relatively high voltage stable operating point. This relatively high voltage biases the base of the transistor 110 sufficiently positive with respect to the emitter thereof to cause the transistor 110 to conduct, whereby its collector, and, therefore, also the base of the transistor 120, assume a low potential only slightly more positive than ground. Accordingly, under these conditions, whenever signals from the phase A source 20 are applied to the emitter of the transistor 120, these signals appear on the output lead 130. The first one of these output signals is applied via input resistor 202 of stage No. 2 to set the diode 200 to its relatively high voltage state, which in a manner identical to that described above for stage No. 1 energizes both the second switching transistor 210 and the first switching transistor 220. Hence, when at a subsequent time phase B signals are applied to the emitter of the transistor 220 from the source 30, these signals appear on the output lead 230.

The first one of the phase B signals which appears on the output lead 230 of stage No. 2 sets the diode 300 and energizes the first and second switching transistors 310 and 320 in stage No. 3. When the transistor 310 is energized the potential at the collector thereof swings from a positive to a less positive value. This negative voltage swing is coupled via lead 101 to the diode 100 in stage No. 1 and resets the diode 100 to its relatively low voltage state. Hence, when at a subsequent time signals again appear at the output of the phase A source 20, these signals are applied to a transistor 120 which is de-energized or closed and to a transistor 320 which is energized or open, whereby the phase A signals are transferred only to output lead 330.

The first one of the phase A signals which appears on the output lead 330 of stage No. 3 sets the diode 400 and energizes the first and second switching transistors 410 and 420 in stage No. 4. When the transistor 410 is energized its collector potential drops to a less positive value. This negative voltage swing is coupled via lead 401 to the diode 200 in stage No. 2 to reset the diode 200 to its relatively low voltage state. Hence, when at a subsequent time signals again appear at the output of the phase B source 30, these signals are applied to closed transistor 220 and open transistor 420 and are transferred only to the output lead 430.

The first one of the positive phase B signals which appears on the output lead 430 of stage No. 4 is applied to a block 450 which inverts the signal and converts it to a negative reset signal that is coupled via lead 402 to the diode 300.

Finally, subsequent to the application of the signal or signals from the phase B source 30 to stage No. 4, the master timing signal source 50 triggers the reset source 40 to supply a reset signal to the diode 400. As a consequence, all the diodes of the four-stage circuit shown in FIG. 1 are then in their relatively low voltage states, ready for a signal from the start source 10 to initiate another complete cycle of operation of the type described in detail above.

It is emphasized that the output of each of the sources 20 and 30 shown in FIG. 1 may be either a single signal or a group of signals. Whatever the nature thereof, replicas of these signals appear in sequence on the output leads 130, 230, 330, and 430. For example, as depicted in FIG. 2, the output of the phase A source 20 may comprise a group of three pulses and that of the phase B source 30 may comprise a group of four pulses. In such a case, a group of three pulses appears on output lead 130 during a first interval of time, a group of four pulses appears on output lead 230 during a second interval of time, a group of three pulses appears on output lead 330 during a third interval of time and, finally, a group of four pulses appears on output lead 430 during a fourth interval of time, as indicated in FIG. 2 wherein the noted intervals of time are respectively designated $t_1$ through $t_4$. Also represented in FIG. 2 are the negative-going pulses described above, which reset the diodes 100, 200, 300, and 400 to their relatively low voltage states.

It is noted that detailed circuit configurations for the sources 10, 20, 30, 40 and 50, and the inverter 450, have not been presented herein, as the detailed structures of these units are considered, in view of the functional requirements therefor set forth hereinabove, to be clearly within the skill of the worker trained in this art. Each of the units 40 and 450 should, it is further noted, include circuitry for respectively biasing the diodes 400 and 300 for bistable operation.

Although only a four-stage stepping switch circuit has been described above and depicted in FIG. 1, it is to be clearly understod that the principles of the present invention extend to an n-stage stepping switch circuit. Significantly, the driving power required from the sources 20 and 30 remains constant regardless of the number of stages included in the circuit because, as indicated above, only one stage at a time draws power from the sources 20 and 30.

Additionally, it is emphasized that although particular attention herein has been directed to the use of tunnel diodes as the voltage-controlled negative resistance elements of the circuit shown in FIG. 1 and the use of transistors as the switching devices thereof, other suitable arrangements having characteristics similar thereto may be substituted therefor.

Furthermore, it is to be understood that the above-described arrangements are only illustrative of the application of the principles of the present invention. Numerous other arrangements may be devised by those skilled in the art without departing from the spirit and scope of this invention.

What is claimed is:

In combination in a high speed stepping switch circuit, a plurality of consecutively-numbered stages arranged in a linear array, each stage including a switching arrangement comprising associated first and second complementary-type common-emitter switching transistors, each transistor including base, emitter and collector electrodes, means connecting the collector electrode of each of said first transistors directly to the base electrode of its associated second transistor, a plurality of output paths respectively connected to the collector electrodes of said second transistors, means connected to the collector electrodes of the first and second transistors in each stage for respectively supplying thereto opposite polarity biasing potentials, each stage further including means for controlling the conduction condition of the first transistor therein, said means for controlling the conduction condition of said first transistor including an associated tunnel diode, means connecting each tunnel diode between the base and emitter electrodes of its associated first transistor, means connected to the emitter electrodes of said second transistors in the odd-numbered stages for supplying thereto successive sets of first phase driving signals, means connected to the emitter electrodes of said second transistors in the even-numbered stages for supplying thereto successive sets of second phase driving signals, wherein a set of second phase signals includes at least one second phase signal and occurs in sequence subsequent to each set of first phase signals, each set of first phase signals including at least one first phase signal, a start signal source connected to the tunnel diode in the first stage of said array for switching said diode from its quiescent to its enabling state to condition the first transistor thereof and thereby also the second transistor in said first stage to pass to the output path of the first stage the first phase signal set applied to the second transistor of said first stage, means responsive to the appearance of a signal on the output path of one stage for causing the tunnel diode in the next following stage to switch from its quiescent to its enabling state, whereby said first and second phase signal sets appear in alternate sequence on the output paths of said stages, means in each individual stage except the first and second stages of said array and responsive to the switching of the first transistor in each individual array for resetting to its quiescent state the tunnel diode included in the first nonadjacent preceding stage, said means for resetting also comprising means in each individual stage except the first and second stages of said array for biasing for bistable operation the tunnel diode included in the first nonadjacent preceding stage, and means connected to the tunnel diodes in the last and next to last stages of said array for biasing said diodes for bistable operation and for resetting said diodes to their quiescent states.

References Cited in the file of this patent

UNITED STATES PATENTS

| | | |
|---|---|---|
| 2,829,281 | Van Overbeek | Apr. 1, 1958 |
| 3,041,476 | Parker | June 26, 1962 |
| 3,054,059 | Ingerman | Sept. 11, 1962 |

OTHER REFERENCES

Akmenkalus: I.B.M. Technical Disclosure Bulletin, vol. 3, No. 8, January 1961 (pp. 38 and 39) (p. 38 relied on).

General Electric Tunnel Diode Manual, Mar. 20, 1961 (p. 43 relied on).